United States Patent
Weber et al.

(10) Patent No.: US 9,083,586 B2
(45) Date of Patent: Jul. 14, 2015

(54) VERIFYING AVAILABILITY AND REACHABILITY THROUGH A NETWORK DEVICE

(75) Inventors: Dieter Weber, Bremen, ME (US); David White, Durham, NC (US); Lawrence Mertes, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

(21) Appl. No.: 13/053,905

(22) Filed: Mar. 22, 2011

(65) Prior Publication Data

US 2012/0246292 A1    Sep. 27, 2012

(51) Int. Cl.
| | |
|---|---|
| G06F 15/173 | (2006.01) |
| G06F 15/16 | (2006.01) |
| H04L 29/08 | (2006.01) |
| H04L 29/06 | (2006.01) |

(52) U.S. Cl.
CPC ...... *H04L 29/08648* (2013.01); *H04L 63/0281* (2013.01)

(58) Field of Classification Search
USPC ......................................... 709/224, 225, 231
See application file for complete search history.

(56) References Cited

U.S. PATENT DOCUMENTS

| | | | |
|---|---|---|---|
| 7,738,403 B2 | 6/2010 | Ottamalika et al. | |
| 2002/0042883 A1 | 4/2002 | Roux et al. | |
| 2007/0041554 A1* | 2/2007 | Newman et al. | 379/218.01 |
| 2007/0112962 A1* | 5/2007 | Lewontin | 709/227 |
| 2007/0258382 A1* | 11/2007 | Foll et al. | 370/252 |
| 2008/0126794 A1* | 5/2008 | Wang et al. | 713/151 |
| 2008/0189781 A1* | 8/2008 | Pathak et al. | 726/12 |
| 2008/0298374 A1 | 12/2008 | Rhoades et al. | |
| 2009/0003226 A1 | 1/2009 | Wang et al. | |
| 2009/0013398 A1* | 1/2009 | Cookmeyer et al. | 726/11 |
| 2010/0161769 A1* | 6/2010 | Qian et al. | 709/221 |
| 2010/0235902 A1* | 9/2010 | Guo et al. | 726/12 |
| 2010/0318799 A1 | 12/2010 | Simon et al. | |
| 2012/0307983 A1* | 12/2012 | Faulkner et al. | 379/29.03 |
| 2013/0088977 A1* | 4/2013 | Baillargeon | 370/251 |

OTHER PUBLICATIONS

PCT International Search Report and Written Opinion received in PCT Application No. PCT/US12/26119 dated May 30, 2012 (10 pages).

Current Claims, PCT Application No. PCT/US12/26119 (7 pages).

(Continued)

*Primary Examiner* — Karen Tang
(74) *Attorney, Agent, or Firm* — Hickman Palermo Becker Bingham LLP (57) ABSTRACT

In an embodiment, in response to receiving from a client computer a client request to connect to a server: processing the client request in a network protection device including applying one or more translations and one or more security checks, generating a server acknowledgment to the client computer as if the server acknowledged receiving the client request from the client computer, processing the server acknowledgement in the network protection device including applying one or more translations and one or more security checks and sending the server acknowledgment to the client computer; in response to receiving a client acknowledgment of receiving the server acknowledgment, determining that a first path between the client computer and the network protection device is operational; generating a server request to the server; processing the server request in the network protection device, determining that a second path between the network protection device and the server is operational.

20 Claims, 5 Drawing Sheets

(56) References Cited

OTHER PUBLICATIONS

Cisco presentation entitled "Connectivity Testing Packet Tracer Enhancements" by Dieter Weber et al., dated Sep. 2009 (9 pgs).

Cisco document entitled "TCP Ping Enhancement Software Functional Specification" by Wes Mertes, printed Jun. 30, 2011, © 2009 Cisco Systems (20 pgs).

* cited by examiner

VERIFYING AVAILABILITY AND REACHABILITY THROUGH A NETWORK DEVICE

TECHNICAL FIELD

The present disclosure is generally related to data communications between devices in a distributed network infrastructure, and specifically relates to troubleshooting of communications problems in networks that contain security devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A new device that is installed in a network may cause network communication problems. For example, if users experience problems with connecting to the network after a new device joined the network's fabric, then the new device is most likely suspected to cause the connectivity issues.

Regardless of whether the suspicion is substantiated or not, devices newly installed in a network and devices reconfigured in the network require a comprehensive testing in the network environment to ensure that the new device seamlessly interacts with the network. Such testing often requires troubleshooting.

Network troubleshooting may be a very complex and time consuming process. In some cases, troubleshooting each individual device and each individual network segment in a network environment may be impractical in a reasonable time. Nevertheless, there might be a need to efficiently identify the source of connectivity problems and to determine for example, whether a particular device or a link to the particular device causes the problems.

Some of the troubleshooting approaches rely on commands such as traceroute, ping or echo. However, traceroute, ping and echo may be insufficient to identify the specific network component that causes the problem. For example, if a particular device is nonresponsive to traceroute, it may be difficult to determine whether the particular device itself is malfunctioning, or whether the link to the particular device or a device along that link is malfunctioning. Furthermore, the traceroute, ping and echo tests may be limited to a specific protocol and/or port, and thus they may be unable to test the actual end-to-end availability of a particular hosted service.

Due to the type and complexity of the tasks performed by a security device, the security device may be the first to blame when a user cannot connect to a server. Because the security device performs security checks to determine whether a data packet is valid, and may drop the packet without notifying the packet's sender when the packet is invalid, troubleshooting of the connection between the customer and the service provider becomes a multifarious task.

From a perspective of a service provider, network troubleshooting may be quite expensive and time consuming. For example, the overhead required to train and provide a skilled staff for processing service calls and resolving network connectivity issues may be considerable.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Verifying Connectivity between a Client and a Network Device
   4.0 Verifying Connectivity between Network Devices
   5.0 Verifying Operability of a Network Device
   6.0 Verifying Reachability of a Network Device
   7.0 Implementation Mechanisms—Hardware Overview
   8.0 Extensions and Alternatives
   1.0 General Overview In an embodiment, a method comprises, in response to receiving from a client computer a client request to connect to a server, processing the client request in a network protection device including applying one or more translations and one or more security checks, generating a server acknowledgment to the client computer as if the server acknowledged receiving the client request from the client computer, processing the server acknowledgement in the network protection device including applying one or more translations and one or more security checks and sending the server acknowledgment to the client computer, and in response to receiving a client acknowledgment of receiving the server acknowledgment, determining that a first path between the client computer and the network protection device is operational.

In an embodiment, the method further comprises generating a server request to the server, and processing the server request in the network protection device including applying one or more translations and one or more security checks.

In an embodiment, the method further comprises, in response to receiving a confirmation from the server that the server received the server request, determining that a second path between the network protection device and the server is operational.

In an embodiment, the method further comprises, in response to determining that the client request is not received within a first time period, determining that the network protection device or the first path to the network protection device is malfunctioning.

In an embodiment, the method further comprises, in response to determining that the client acknowledgment is not received within a second time period, determining that the first path is malfunctioning.

In an embodiment, the method further comprises, in response to determining that the confirmation from the server is not received within a third time period, determining that the server or the second path is malfunctioning.

In an embodiment, the network protection device is any of the following: a firewall, an intrusion prevention device, a router and a switch.

In an embodiment, the first connection either directly connects the client computer with the network protection device or connects the client computer with the network protection device via one or more intermediate devices.

In an embodiment, the second connection either directly connects the network protection device with the server or connects the network protection device with the server via one or more intermediate devices.

In an embodiment, the client request is a Transmission Control Protocol (TCP) synchronization (SYN) packet, the server acknowledgment is a spoofed TCP synchronization-acknowledgment (SYN-ACK) packet, the client acknowledgment is a TCP acknowledgment (ACK) packet, the server request is a spoofed TCP SYN segment, and the confirmation is a TCP SYN-ACK segment.

In an embodiment, the network protection device is a security device configured to apply Network Address Translation (NAT)/Port Address Translation (PAT) to the request or response.

In an embodiment, the method further comprises tagging the client request with a tag specific for the client request, correlating the client request with the server acknowledgment, and correlating the client acknowledgment with the client request and the server acknowledgement and tagging the server request with the client request using the tag specific for the client request, correlating the server request with the client request, and correlating the confirmation with the server request and the client request.

In an embodiment, an apparatus comprises one or more processors, a Transport Control Protocol (TCP) logic and a management logic, configured respectively to perform processes described herein.

In an embodiment, a non-transitory computer-readable storage medium stores one or more sequences of instructions which, when executed by one or more processors, cause the one or more processors to perform the processes described herein.

2.0 Structural and Functional Overview

In an embodiment, the approaches described herein provide a holistic approach for testing end-to-end path connectivity. The testing is performed by monitoring not only incoming packets as they are received by a particular device and monitoring outgoing packets as they are sent from the particular device, but also by monitoring the incoming packets and outgoing packets as they are processed by a particular device.

In an embodiment, an incoming packet is monitored not only as it is received at an ingress port of the particular device, but also as the incoming packet is processed by the particular device and forwarded from the ingress port of the particular device to an egress port of the particular device before the packet is disseminated to the network.

In an embodiment, an outgoing packet is monitored not only as it is disseminated from an egress port of the particular device to a network, but also during processing of the packet by the particular device, including injecting the packet onto an ingress port of the particular device, processing the packet by the particular devices, and transmitting the packet from the ingress port to the egress port of the particular device.

In an embodiment, data communications packets that are transmitted via a particular device are tagged. The actions taken with respect to the tagged packets are recorded and correlated with each other based on the tags associated with the packets.

In an embodiment, the outcome of the actions taken with respect to the tagged packets as the tagged packets are processed by a particular device is monitored and used to determine whether the actions were successful. For example, if a particular device is a network security device such as a firewall, and the particular device performs actions such as Network Address Translation (NAT), address inspection, packet inspection, packet queuing, security policy application, the outcome of each of the actions is recorded and used to determine whether the particular device functions properly.

In an embodiment, the disclosed approach allows isolating an end-to-end path that has been reported as experiencing connectivity problems and determining the source of the problems.

An end-to-end path may start from a client and end at a destination server. For example, an end-to-end path may be initiated by a client application launched by a user who requests access to a particular server, which may belong to a local or remote network. For instance, an end-to-end path may start at the client, continue via several intermediate devices such as firewalls, gateways, switches and routers, and end at the particular destination server.

In an embodiment, if a user experiences difficulties in connecting to a particular server, then a corresponding end-to-end path between the user and the particular server is tested to determine the cause of the problem. The problem may be caused by any of the following sources, for example: a user's device, a connection between the user's device and a security device, a connection between the security device and the particular server, or by the security device itself. In some situations, the problem may be caused by more than one source.

In an embodiment, validating end-to-end network connectivity is performed by monitoring a flow of Transport Control Protocol (TCP) packets that are transmitted along the path. In an embodiment, from the perspective of an intermediate network device, such as a firewall or a gateway, the TCP flow may have three legs. A first leg may include the TCP flow transmitted from a client to the intermediate network device. A second leg may include the TCP flow transmitted through the network device itself. A third leg may include the TCP flow transmitted from the network device to a destination server.

In an embodiment, in order to validate end-to-end connectivity between a client and a destination device, the intermediate network device verifies connectivity along the first and third legs of the connection in addition to testing operability of the network device itself.

In an embodiment, a network troubleshooting process may be divided into three phases. A first phase focuses on determining whether a problem is caused by communications that are exchanged between a client and a network security device. The corresponding testing path includes a client's device, a connection between the user's device and the network security device, and the network security device, and is referred to as a "first leg."

A third phase focuses on determining whether the problem is caused by communications that are exchanged between a network security device and the server. The corresponding testing path includes the network security device, a connection between the network security device and the server, and is referred to as a "third leg."

A second phase focuses on determining whether the problem is caused by the network security device itself. This phase may be performed if at least one of the first and third phases indicated problems with the network security device, or when it is suspected that the network security device itself may cause connectivity problems. The corresponding testing path is referred to as a "second leg."

Figure 5:
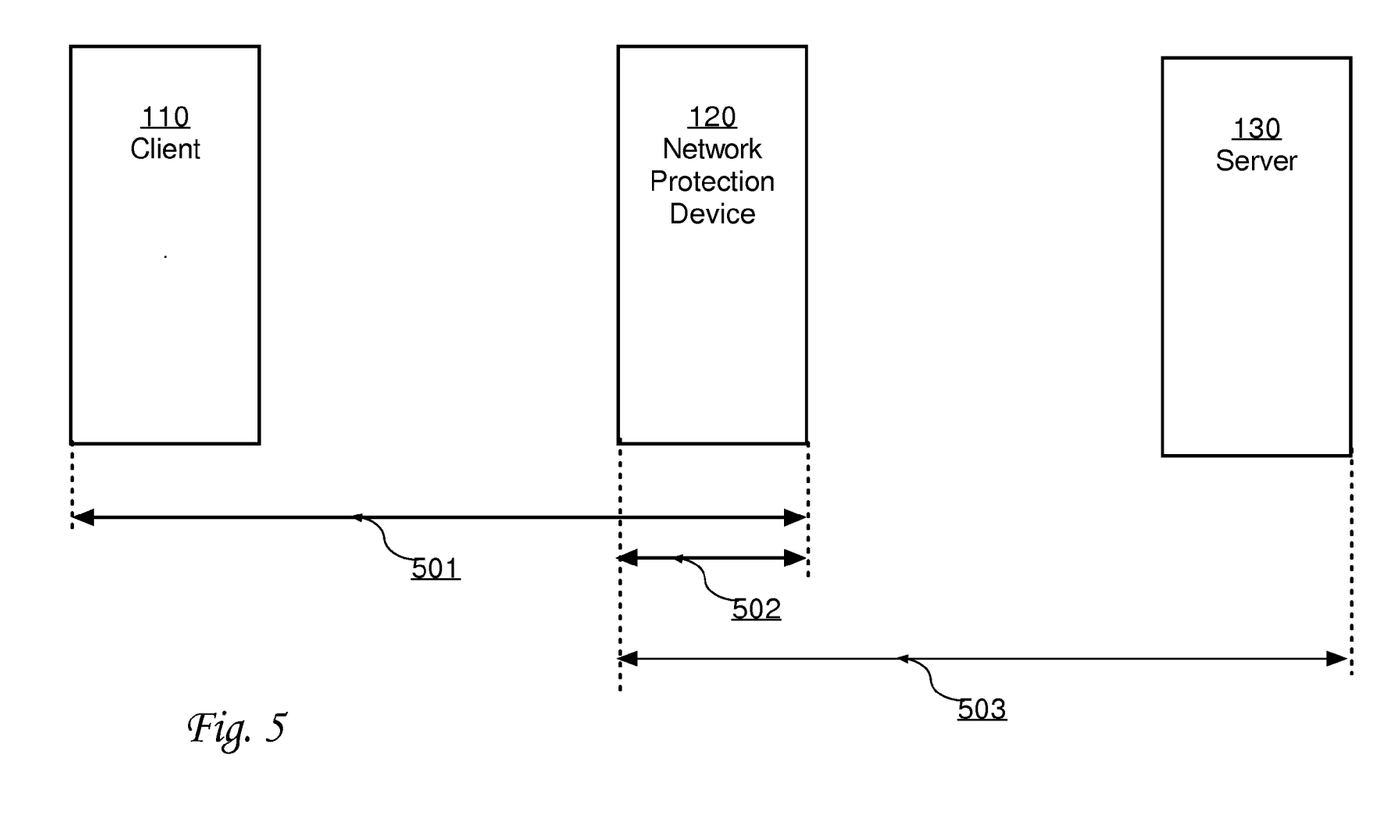
FIG. 5 illustrates an embodiment of communications between a client, a network protection device and a server.

FIG. 5 illustrates an embodiment of communications between a client 110, a network protection device 120 and a server 130. In an embodiment, a first leg 501 may include the TCP flow transmitted from client 110 to network protection device 120 and processed by network protection device 120. A second leg 502 may include the TCP flow transmitted through network protection device 120 itself. A third leg 503 may include the TCP flow processed by network protection device 120, and transmitted from network protection device 120 to server 130.

The order in which the troubleshooting phases are executed may vary. For example, in one embodiment, the first phase is performed first. Upon completion of the first phase, the third phase may be performed. If the troubleshooting performed during the first phase and/or the third phase proves some problems, then the second phase of troubleshooting may be excluded In an embodiment, if the first phase of troubleshooting results in detecting errors, then the focus may be shifted to resolving the problem on a client's site and/or along a sub-path from a user's device to a network security device. When those problems are resolved, the system may proceed to executing the second or third phase of troubleshooting.

In an embodiment, if the third phase of troubleshooting indicates errors, then the focus may be shifted to resolving the problem on a destination server site and/or along a sub-path from a network security device to the destination server. When those problems are resolved, the system may proceed to executing the second or first phase of troubleshooting.

When dealing with network security devices, testing a security device itself may be quite critical because of the complexity of the processing that is performed by the security device. For example, a security device such as a firewall usually applies various security polices to transient data packets, and performs complex testing of the transient packet to ensure security of the network even if that requires that some packets are dropped. Therefore, in case of a firewall or a gateway, identifying whether the security device is malfunctioning or actually performs its tasks may be difficult.

The nature of the tasks performed by a security device may significantly influence a user's perception of the network operability. A security device may modify transient packets and even drop some packets without notifying the sender of the packets. For example, the security device may apply the network policy to the packets, execute a NAT/PAT process to translate an IP address or a port number, remove TCP/IP flags, or modify TCP/IP options. The operations may cause devices along the path (either the first leg or third leg) to drop the packet, or for the client or server to drop the packet.

Figure 1:
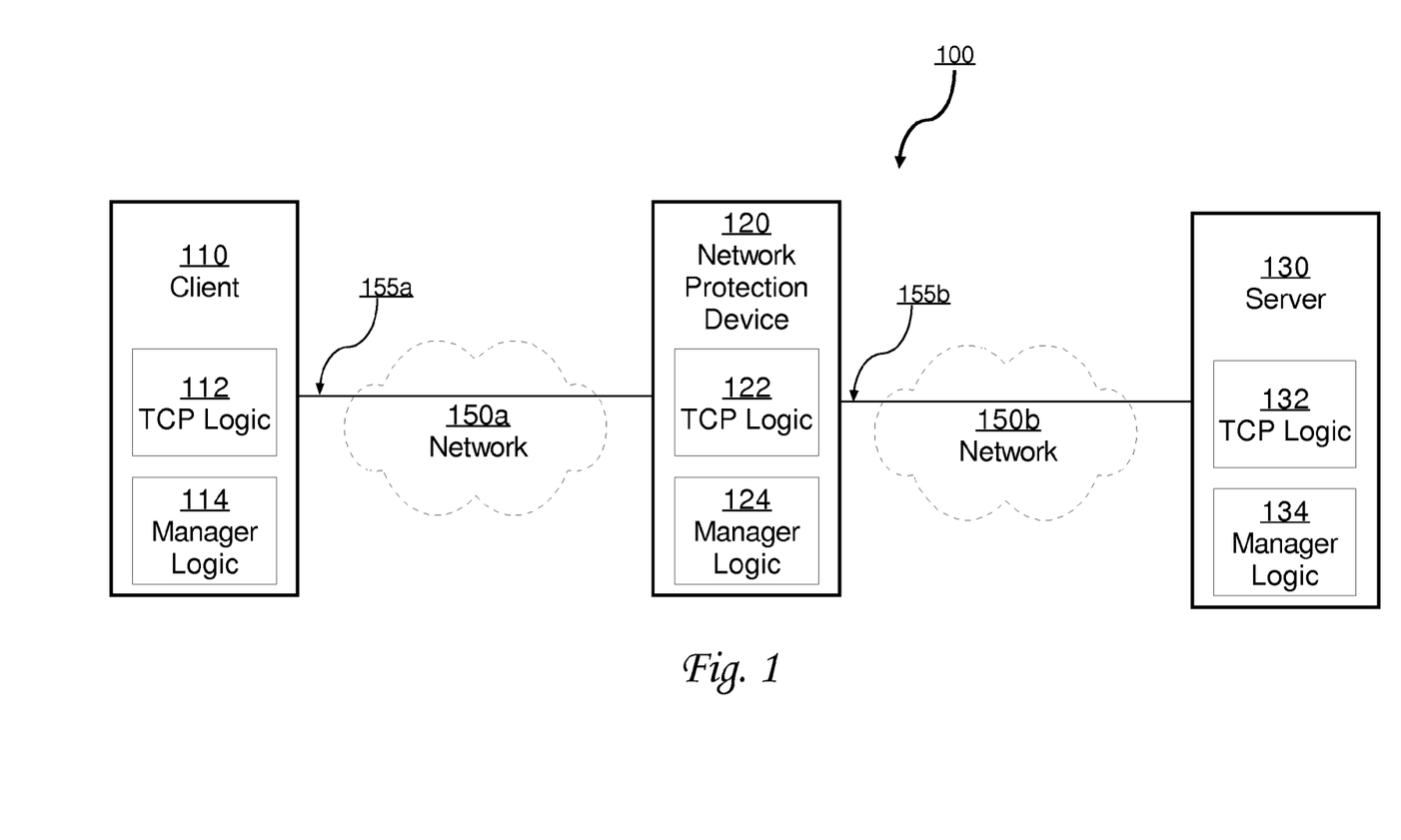
FIG. 1 illustrates an embodiment of communications between clients and servers.

FIG. 1 illustrates an embodiment of communications between clients and servers in a data communication network 100. In an embodiment, network 100 is a packet-switched data network and the nodes comprise routers, switches, firewalls, gateways or other infrastructure elements; in some embodiments, the nodes may comprise computers or other endpoints.

In an embodiment, data communications network 100 comprises one or more applications or clients 110 executed on a user's workstation, laptop, PDA device, phone, etc. Data communications network 100 also comprises a network protection device 120, a server 130 and two or more sub-networks 150a, 150b.

For purposes of illustrating clear examples, FIG. 1 shows one client 110, one network protection device 120, one server 130 and two sub-networks 150a, 150b. However, practical embodiments may use any number of clients 110, network protection devices 120 servers 130 and sub-networks 150a, 150b.

In an embodiment, a sub-network 150a is communicatively coupled to client 110 and a network protection device 120. In an embodiment, a sub-network 150b is communicatively coupled to network protection device 120 and server 130.

In an embodiment, client 110, network protection device 120 and server 130 are configured to implement Transport Communications Protocol (TCP). For example, client 110 may establish a communications TCP session with network protection device 120 and/or server 130. Furthermore, client, network protection device 120 and server 130 may communicate with each other by exchanging TCP-compliant communications.

In an embodiment, client 110, network protection device 120 and server 130 are configured to implement communications protocols other than TCP.

Client 110, network protection device 120 and server 130 may implement the processes described herein using hardware logic such as in an application-specific integrated circuit ("ASIC"), field-programmable gate array ("FPGA"), system-on-a-chip ("SoC") or other combinations of hardware, firmware and/or software.

In an embodiment, client 110 network protection device 120, and server 130 comprise hardware or software logic configured to generate and maintain various types of communication session information, and routing information for a data communications network 100.

In an embodiment, client 110 comprises TCP Logic 112 and manager logic 114.

In an embodiment, network protection device 120 comprises TCP logic 122 and manager logic 124, and server 130 comprises TCP logic 132 and manager logic 134.

In an embodiment, TCP logic 112, 122 and 132 implement TCP. In other embodiments, TCP logic 112, 122 and 132 implement another transport layer protocol such as SCTP.

Referring again to FIG. 1, in an embodiment, a connection between client 110 and network protection device 120 is referred to as a first leg 155a. First leg 155a connects client 110 with network protection device 120 via network 150a. First leg 155a may be implemented as a direct physical connection (wire) between client 110 and network protection device 120. Alternatively, first leg 155a may be implemented as a sub-path comprising several nodes and links, or a combination of nodes, links and one or more networks 150a.

In an embodiment, the connection between network protection device 120 and server 130 is referred to as the third leg 155b. Third leg connects network protection device 120 to server 130 via network 150b. Third leg 155b may be implemented as a direct physical connection (wire) between network protection device 120 and server 130. Alternatively, third leg 155b may be implemented as a sub-path comprising several nodes and links, or a combination of nodes, links and one or more networks 150b.

In an embodiment, network protection device 120 is configured to implement functionalities of a security network device. Examples of security network device include firewalls, gateways, proxies and egress filter. Since client 110 and server 130 are on the opposite sides of the security device (network protection device 120), communications between client 110 and server 130 are transmitted and inspected by network protection device 120.

Upon receiving an indication that client 110 attempted to establish a TCP communications session with server 130, but the attempt was unsuccessful, the system may start testing operability of the end-to-end path between client 110 and server 130. In an embodiment, the testing includes testing the first leg 155a and third leg 155b, and also includes testing of the intermediate network protection device 120.

The approaches described herein are applicable to testing operability of an end-to-end path when the path is initiated by either client 110 or server 130. For example, the processes may test the communications flow from client 110 toward server 130, and/or the communications flow from server 130 to client 110. The communications flows may be mirrored with respect to each other; and so can the testing steps of the presented approach.

Furthermore, the approach may be expanded to verifying host reachability based on communications session between not just one client and one server, but between two or more clients and two or more servers.

3.0 Verifying Connectivity Between a Client and a Network Device

In an embodiment, a process allows a network device to validate the end-to-end network connectivity, including transient connectivity of an intermediate network device itself. For example, the end-to-end connectivity may be determined for a communications path between a client and a server when the communications path passes via one or more intermediate network devices, such as a firewall or a gateway.

Figure 2:
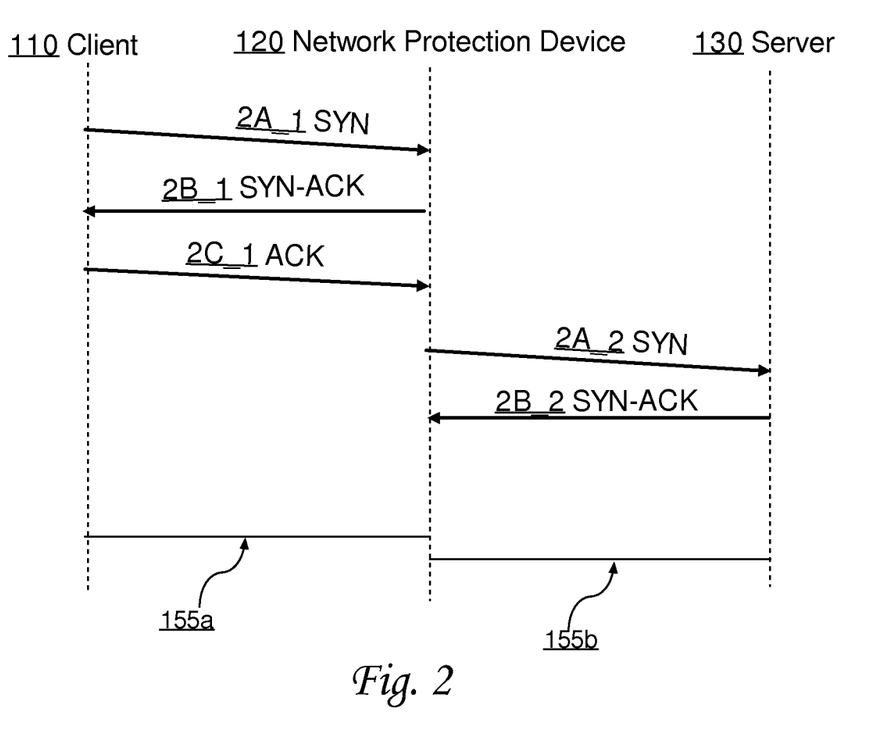
FIG. 2 illustrates an embodiment of testing connectivity between clients and servers.

FIG. 2 illustrates an embodiment of testing connectivity between client 110 and server 130 communicating with each other via network protection device 120. In an embodiment, client 110 attempts to establish a communications session with server 130.

Communications sessions may be implemented as part of protocols and services at the application layer, at the session layer or at the transport layer of the Open System Interconnect (OSI) model. Examples of application layer communications sessions include HTTP sessions and telnet sessions. Examples of session layer communications sessions include Session Initiation Protocol (SIP) sessions. Examples of transport layer communications sessions include Transport Control Protocol (TCP) sessions.

In an embodiment, client 110 attempts to establish a TCP communications session with server 130 according to a Transport Control Protocol (TCP), and using the TCP three-way handshake approach in which sender sends a TCP Synchronization (SYN) segment to a receiver. Upon receiving the SYN segment, the receiver verifies legitimacy of the request and the sender. If the legitimacy is successfully verified, then the receiver responds to the sender by sending a synchronization-acknowledgment (SYN ACK) segment.

Upon receiving the SYN ACK segment, the sender verifies validity of the SYN ACK segment, and if the verification is successful, the sender responds to the receiver by sending an acknowledgment (ACK) segment.

Upon a successful receipt of the ACK segment by the receiver, the communication session between the sender and the receiver is considered to be established, and the sender and receiver may start exchanging segments containing substantive data.

In an embodiment, client 110 attempts to establish a TCP session with server 130 by transmitting TCP data segments via network protection device 120. However, the presence of network protection device 120, such as a firewall or a gateway, as an intermediary between client 110 and server 130 makes establishing of the communications connection between client 110 and server 130 complicated. For example, referring again to FIG. 1, instead of transmitting communications packets via a single direct connection from client 110 to server 130, packets from client 110 are transmitted via sub-network 150a to network protection device 120, processed by network protection device 120, and then transmitted via sub-network 150b to server 130. Similarly, instead of transmitting communications packets via a single direct connection from server 130 to client 110, the packets from server 130 are transmitted via sub-network 150b to network protection device 120, processed by network protection device 120, and then transmitted via sub-network 150a to client 110. In practical implementation, paths between client 110 and server 130 may be even more complicated and may include a plurality of intermediate routers or servers.

In an embodiment, the processes herein provide a holistic approach for identifying paths and/or the nodes that are non-operational along an end-to-end communications path. Since analyzing reachability of a server 130 from a client 110 may be a very complex task especially for secure communications networks, the network troubleshooting may start from dividing the end-to-end path between client 110 and server 130 into legs, and analyzing each "leg" separately. By analyzing each leg of the communications path separately, it may be easier to determine the source of the node reachability problem. The disclosed approach allows determining whether each of the legs of the communications path between a source and a destination is operational and whether each of the devices along the end-to-end paths is operational.

Referring again to FIG. 2, client 110 attempts to establish a TCP communication session with server 130 by sending a TCP SYN segment, depicted in FIG. 2 as 2A_1 SYN segment, to server 130. In an embodiment, the segment 2A_1 SYN is received on one of the ingress ports of network protection device 120.

In an embodiment, network protection device 120 (firewall) intercepts segment 2A_1 SYN, sent from client 110, and tags segment 2A_1 SYN with a tag. The tag may contain information specific to an actual request issued by client 110, information specific to client 110, information specific to network protection device 120, or other information useful to troubleshoot the network connectivity.

In an embodiment, network protection device 120 records information about the tagged segment 2A_1 SYN, triggers recording of any subsequent actions taken with regard to the packet containing that segment, and correlates subsequent actions taken with respect to that packet.

In an embodiment, tagged segment 2A_1 SYN is transmitted via network protection device 120 toward one of the egress ports of network protection device 120. A particular egress port may be selected from all egress ports available on network protection device 120 according to the policy implemented on network protection device 120, port selection rules, or any other method known in the art.

In an embodiment, as the tagged segment 2A_1 SYN packet is transmitted toward a particular egress port of network protection device 120, actions that are taken by network protection device 120 with respect to the tagged segment 2A_1 SYN packet are recorded and correlated with stored information related to segment 2A_1 SYN.

In an embodiment, actions performed by the applications executed by network protection device 120 may include policy-related actions, network address translation, packet inspection, packet queuing and any other actions specific to the functions assigned to network protection device 120.

In an embodiment, network protection device 120 performs Network Address Translation (NAT) functions, and is configured to perform translation of network addresses between domains and users.

Network Address Translation (NAT) allows overwriting a source or destination Internet Protocol (IP) address and/or TCP/UDP port numbers of IP packets as they pass through a network device. For example, upon receiving a packet from client 110, network protection device 120 analyzes the packet's header, identifies an IP address of the destination in the header, and translates the destination's IP address to a new address that is known in the network that encompasses server 130. For instance, if client 110 sends a data packet having a destination IP address of 10.1.1.2 as the IP address of server 130, then, upon receiving the data packet but before sending the data packet to server 130, network protection device 120 may translate the IP address of 10.1.1.2 to an IP address of 192.168.2.1, which is the address of server 130 in the server's network.

Similarly, if server 130 sends a data packet having a destination IP address of 192.168.4.1 as the IP address of client 110, then, upon receiving the data packet but before sending the data packet to client 110, network protection device 120 may translate the IP address of 192.168.4.1 to IP address of 10.1.4.2, which is the address of client 110 in the client's network In an embodiment, as segment 2A__1 SYN is transmitted toward a particular egress port of network protection device 120, network protection device 120 may need to translate the IP address of the destination (or the source) using the NAT approach described above. Because segment 2A__1 SYN is tagged, all actions related to NAT processing of segment 2A__1 SYN are recorded and correlated with other information related to segment 2A__1 SYN.

In an embodiment, when the tagged segment 2A__1 SYN reaches a particular egress port of network protection device 120, network protection device determines whether a communications session could be established between client 110 and server 130. In response to determining that such a session could have been established, network protection device 120 pretends to act on behalf of server 130, and "spoofs" a response that server 130 might have generated upon receiving a SYN segment from client 110. For example, network protection device 120 may pretend to "act" on behalf of server 130, respond to client 110 by generating and transmitting a SYN-ACK segment 2B__1 to client 110 on behalf of server 130, and subsequently await an acknowledgment of receiving the SYN-ACK segment 2B__1 from client 110 to complete a TCP three-way handshake.

In an embodiment, network protection device 120 may store the 2A__1 SYN segment, but may not disseminate the 2A__1 SYN segment any further. For example, network protection device 120 may store the 2A__1 SYN segment, but not transmit it via network 150*b* to server 130.

In an embodiment, network protection device 120 spoofs a 2B__1 SYN-ACK segment, tags the 2B__1 SYN-ACK segment with a tag corresponding to the tag used to tag the 2A__1 SYN segment, and injects the tagged 2B__1 SYN-ACK segment onto one of the ingress ports of network protection device 120.

In an embodiment, the tagged 2B__1 SYN-ACK segment is transmitted via network protection device 120 toward one of the egress ports of network protection device 120 that is close to client 110. A particular egress port may be selected from all egress ports available on network protection device 120 according to the policy implemented on network protection device 120, port selection rules, or any other method known in the art.

In an embodiment, as the tagged 2B__1 SYN-ACK segment is transmitted toward a particular egress port of network protection device 120, actions that are taken by network protection device 120 with respect to the tagged 2A__1 SYN segment are recorded and correlated with stored information related to the 2A-1 SYN segment and 2B__1 SYN-ACK segment.

In an embodiment, actions performed by the applications executed by network protection device 120 may include policy-related actions, network address translation, packet inspection, packet queuing and any other actions specific to the functions assigned to network protection device 120. For example, network protection device 120 may be configured to perform translation of network addresses between domains and users.

In an embodiment, as a 2B__1 SYN-ACK segment is transmitted toward a particular egress port of network protection device 120, network protection device 120 may need to translate the IP address of the destination using the NAT approach described above. Because the 2B__1 SYN-ACK segment is tagged, all NAT actions related to NAT processing of the 2B__1 SYN-ACK segment are recorded and correlated with stored information related to the 2B__1 SYN-ACK segment.

In an embodiment, all actions related to processing the tagged 2B__1 SYN-ACK segment as the segment is transmitted from an ingress port of network protection device 120 to an egress port of network protection device 120 are recorded and correlated with each other.

Once the 2B__1 SYN-ACK segment reaches a particular egress port of network protection device 120, the 2B__1 SYN-ACK segment is transmitted to client 110.

Meanwhile, after sending the 2A__1 SYN segment, client 110 awaits a SYN-ACK segment from server 130. However, since network protection device 120 intercepted the 2A__1 SYN segment, and responded to that segment by pretending to act on behalf of server 130, client 110 might receive a SYN-ACK segment from network protection device 120, not from server 130. Indeed, after network protection device 120 sent the 2B__1 SYN-ACK segment to client 110, client 110 receives the 2B__1 SYN-ACK segment from network protection device 120, not from server 130. However, to client 110, the "spoofed" 2B__1 SYN-ACK segment will appear as if it were sent from server 130.

In an embodiment, client 110 may not have data indicating that it received a spoofed SYN-ACK segment, or that network protection device 120 is performing a test of a first connection 155*a* between client 110 and network protection device 120.

Alternatively, client 110 may be informed about the test, or even initiate the test. For example, if client 110 has been unsuccessful in establishing a TCP connection with server 130, then client 110 may request that the connection between client 110 and server 130 be tested, and to start a troubleshooting test, client 110 may attempt to establish a connection with a network protection device 120.

Referring again to FIG. 2, upon receiving the 2B__1 SYN-ACK segment, client 110 generates a TCP acknowledgment (ACK) segment 2C-1 ACK, and transmits the 2C-1 ACK segment toward server 130 via network protection device 120.

In an embodiment, upon receiving the 2C-1 ACK segment, network protection device 120 may determine that a connection 155a between client 110 and network protection device 120 is operational and that server applications executed on network protection device 120 involved in providing connectivity between client 110 and network protection device 120 are functioning properly.

However, if after sending the 2B_1 SYN-ACK segment to client 110, network protection device 120 does not receive an expected acknowledgment from client 110, then network protection device 120 may conclude that a connection 155a between client 110 and network protection device 120 is non-operational. At this point, it is known that there might be a unidirectional problem on the first leg of the connection. Since the network protection device received 2A_1 SYN segment, the path from client 110 to network protection device 120 is valid. However, since 2C-1 ACK segment was not received by network protection device 120, it can be assumed that the path from network protection device 120 to client 110 is not functioning.

In such a situation, network protection device 120 may communicate information about the problem to other nodes in the network and to a system administrator, and generate error logs and error messages containing information about the problem. Further testing of the connectivity between client 110 and network protection device 120 may be postponed until the "first leg" 155a is fully tested and repaired and/or until the problems occurring with client 110 itself are resolved.

In an embodiment, when network protection device 120 was expecting to receive the 2A_1 SYN segment from client 110, but a packet containing that segment has not been received within a specified time period, network protection device 120 may deduce that there is a problem with either client 110 or first leg 155a (or both). For example, if upon the expiration of the timer, network protection device 120 does not receive the 2A_1 SYN segment from client 110, then network protection device 120 may communicate information about the problem to other nodes in the network and a system administrator, and generate error logs and error messages containing information about the problem.

In an embodiment, network protection device 120 may deduce that there is a problem with either client 110 or first leg 155a (or both) when the 2A_1 SYN segment is received from client 110 by network protection device 120, but the 2A_1 SYN segment was denied or dropped by a configured rule executed by an application on network protection device 120. In such a situation, network protection device 120 may communicate information about the problem to other nodes in the network and a system administrator, and generate error logs and error messages containing information about the problem.

4.0 Verifying Connectivity Between Network Devices

In an embodiment, as part of the end-to-end path connectivity testing, a network protection device initiates a third phase of troubleshooting of the path. In the third phase of troubleshooting, the network protection device tests operability of the link between the network protection device and the server. In an embodiment, the network protection device may be any type of a security network device, such as a firewall or a gateway, and server 130 may be any type of a communications server, router or other network device.

Referring again to FIG. 2, in an embodiment, a network protection device 120 is configured to test connectivity between the network protection device and a server 130 using a three-way handshake TCP approach described above, except that the three-way handshake TCP process is performed between the network protection device and the server, and only the first two steps of the three-way handshake are performed.

In an embodiment, network protection device 120, which may be a firewall, injects a 2A_2 SYN segment onto one of the network protection device's ingress interfaces that is close to client 110. For example, network protection device 120 may "spoof" the client's IP address and inject the packet on the network protection device's ingress interface, thereby pretending to act on behalf of client 110.

In an embodiment, network protection device 120 either pretends to be a client that attempts to establish a communications session with server 130 and injects a new segment, or retrieves a previously stored 2A_1 SYN segment that was received from client 110 when client 110 attempted to establish a communications session with server 130. For simplicity, regardless of whether the SYN segment is new or retrieved, the segment is depicted in FIG. 2 as 2A_2 SYN segment.

In an embodiment, a 2A_2 SYN segment is tagged. The tag may contain information specific to an actual request issued by client 110, information specific to client 110, information specific to network protection device 120, or other information useful to troubleshoot the network connectivity.

In an embodiment, network protection device 120 uses a tag associated with the 2A_2 SYN segment to record information about the 2A_2 SYN segment, record any subsequent actions taken with regard to that segment or a packet encapsulating it, and correlate subsequent actions taken with respect to that segment or packet.

As the 2A_2 SYN segment is processed and transmitted via components of network protection device 120, the actions taken by applications executed on network protection device 120 with respect to the 2A_2 SYN segment are recorded and correlated with other information about the 2A_2 SYN packet using the tag as a reference.

In an embodiment, network protection device 120 performs actions specific to a Network Address Translation (NAT) device, and is configured to perform translation of network addresses between domains and users.

In an embodiment, as a 2A_2 SYN segment is transmitted toward a particular egress port of network protection device 120, network protection device 120 may need to translate an IP address of the destination using the NAT approach described above. Because the 2A_2 SYN segment is tagged, all NAT actions related to NAT processing of the 2A_2 SYN segment are recorded and correlated with stored information related to the 2A_2 SYN segment.

In an embodiment, once the tagged 2A_2 SYN segment reaches an egress interface of network protection device 120, the tag associated with the 2A_2 SYN segment is removed (stripped off), and the 2A_2 SYN segment is transmitted to server 130.

Once the 2A_2 SYN segment reaches a particular egress port of network protection device 120, the 2A_2 SYN segment is transmitted to server 130.

In an embodiment, after sending the 2A_2 SYN segment to server 130, network protection device 120 awaits a SYN-ACK segment from server 130.

In an embodiment, the 2A_2 SYN segment is received by server 130. Server 130 may be unaware of the fact that the 2A_2 SYN segment was actually sent (spoofed) by network protection device 120 pretending to act on behalf of client 110. In fact, from the information included in the 2A_2 SYN segment, server 130 may deduce that 2A_2 SYN might have been sent by client 110.

In an embodiment, server 130 may verify validity of the 2A_2 SYN segment, and if the verification is successful, server 130 may respond by generating and transmitting a SYN-ACK segment (depicted in FIG. 2 as 2B_2 SYN-ACK segment) packet to client 110.

In an embodiment, as the 2B_2 SYN-ACK segment is transmitted toward client 110, the 2B_2 SYN-ACK packet segment is intercepted by network protection device 120 at an ingress port of network protection device 120. The network protection device 120 may tag the 2B_2 SYN-ACK segment at the ingress port of the network protection device 120 on which the 2B_2 SYN-ACK segment was received.

As the 2B_2 SYN-ACK segment is processed and transmitted via components of network protection device 120, the actions taken by applications executed on network protection device 120 with respect to the 2B_2 SYN-ACK segment are recorded and correlated with other information about the 2B_2 SYN-ACK segment using the tag as a reference.

In an embodiment, network protection device 120 performs actions specific to a Network Address Translation (NAT) device, and is configured to perform translation of network addresses between domains and users.

In an embodiment, as the 2B_2 SYN-ACK segment is transmitted from a particular ingress port toward a particular egress port of network protection device 120, network protection device 120 may need to translate the IP address of the destination using the NAT approach described above. Because the 2B_2 SYN-ACK segment is tagged, all NAT actions related to NAT processing of the 2B_2 SYN-ACK segment are recorded and correlated with stored information related to the 2B_2 SYN-ACK segment.

In an embodiment, all actions related to processing the tagged 2B_2 SYN-ACK segment as the 2B_2 SYN-ACK segment is transmitted from an ingress port of network protection device 120 to an egress port of network protection device 120 are recorded and correlated with each other.

In an embodiment, when the 2B_2 SYN-ACK segment reaches an egress port of network protection device 120, the 2B_2 SYN-ACK segment is dropped. Dropping of the 2B_2 SYN-ACK segment at this point may mean that network protection device 120 terminates transmission of the 2B_2 SYN-ACK segment to client 110 even though the 2B_2 SYN-ACK segment was intended for the client 110.

In an embodiment, upon receiving the 2B-2 SYN-ACK segment, network protection device 120 may conclude that the connection 155b between network protection device 120 and server 130 is operational and that the applications executed on network protection device 120 and server involved in providing connectivity between network protection device 120 and server 130 are functioning properly.

In an embodiment, if client 110 still is unable to connect to server 130, upon receiving the 2B-2 SYN-ACK segment, network protection device 120 may conclude that server 130 may be non-operational. This conclusion is reached after testing connectivity using data packets exchanged with a client and testing the packets exchanged with the server including the packet processing by the network protection device itself. By applying an elimination approach, if a client still cannot connect to server 130, but the first leg and the second leg are operational and network protection device such as a firewall is operational as well, then the source of the problem may be in server 130.

In an embodiment, if for some reason server 130 is unable to acknowledge readiness to establish a TCP communications session, then, instead of sending the 2B_2 SYN-ACK segment to network protection device 120, server 130 may generate and send a reset request (RST) segment to network protection device 120 to reset the requested TCP communications session. The RST segment is not depicted in FIG. 2. Sending a RST segment to network protection device 120 allows the server 130 to immediately terminate the connection request from the network protection device 120 (spoofed on behalf of client 110).

In an embodiment, if server 130 replied to the 2A_2 SYN segment with a TCP reset request (RST), an indication that an ICMP port is unreachable or some error message, then such responses are also intercepted by network protection device 120, tagged at an ingress port of the network protection device 120, and correlated with the 2A_2 SYN segment. However, since the RST packets, ICMP port-unavailable packets, and other error message packets indicate that the TCP communications connections cannot be established with server 130, an error message describing the condition of either server 130 or the connection between network protection device 120 and server 130 is generated and disseminated.

Also, if after sending the 2A_2 SYN segment to server 130, network protection device 120 does not receive an expected acknowledgment from server 130, then network protection device 120 may conclude that either the connection 155b between network protection device 120 and server 130 is non-operational, or that server 130 itself experiences some type of hardware/software problem. In such a situation, network protection device 120 may communicate information about the problem to other nodes in the network and a system administrator, and generate error logs and error messages containing information about the problem. Further testing of the connectivity between network protection device 120 and server 130 may be postponed until the "third leg" 155b is fully tested and repaired and/or until the problems occurring with server 130 are resolved.

In an embodiment, network protection device 120 may deduce that there is a problem with either server 130 or third leg 155b (or both) when network protection device 120 is expecting to receive a 2B_2 SYN-ACK segment from server 130, but such a packet has not been received within a certain time period. For example, if upon expiration of a preset timer, network protection device 120 does not receive 2B_2 SYN-ACK segment from client 110, then network protection device 120 may communicate information about the problem to other nodes in the network and a system administrator, and generate error logs and error messages containing information about the problem.

In an embodiment, network protection device 120 may deduce that there is a problem with either server 130 or third leg 155b (or both) when 2B_2 SYN-ACK segment is received from server 130, but 2A_2 SYN-ACK segment was denied or dropped by a configured rule executed by an application on network protection device 120. In such a situation, network protection device 120 may communicate information about the problem to other nodes in the network and a system administrator, and generate error logs and error messages.

5.0 Verifying Operability of a Network Device

In an embodiment, as part of the end-to-end path connectivity testing, a network protection device may initiate a second phase of troubleshooting. In the second phase of troubleshooting, the network protection device tests operability of a sub-path transient via the network protection device itself (the "second leg"). The second phase troubleshoots the network protection device itself. The test is performed in addition to the tests performed during the first phase and the third phase described above since to some degree, a combination of the first and third phases does test operability of the transient path via the network protection device itself.

Referring again to FIG. 2, in an embodiment, validity of the path transient via a network protection device 120 is performed using both packets received and sent via the first and third legs described above.

Referring again to FIG. 2, in an embodiment, data communications packets that were communicated along first leg 155a and third leg 155b were tagged as described above. As the packets traverse network protection device 120 (second leg), actions taken by network protection device 120 with respect to the tagged packets may be identified and the actions may be recorded in reference to the respective tags. Furthermore, the actions recorded for the tagged packet may be correlated with each other and with the configuration of network protection device 120.

Referring again to FIG. 2, in an embodiment, by combining the ability to intercept and respond to packets received from a client 110 and the ability to inject and receive a response from a server 130 with the ability to verify the operability of the network protection device 120 itself, the disclosed approach may provide a holistic solution for identifying a source of the network connectivity problems. The process may be used to provide testing of end-to-end connectivity between client 110 and any server that is separated from client 110 by one or more network security devices, such as a firewall or gateway.

6.0 Verifying Reachability of a Network Device

Figure 3:
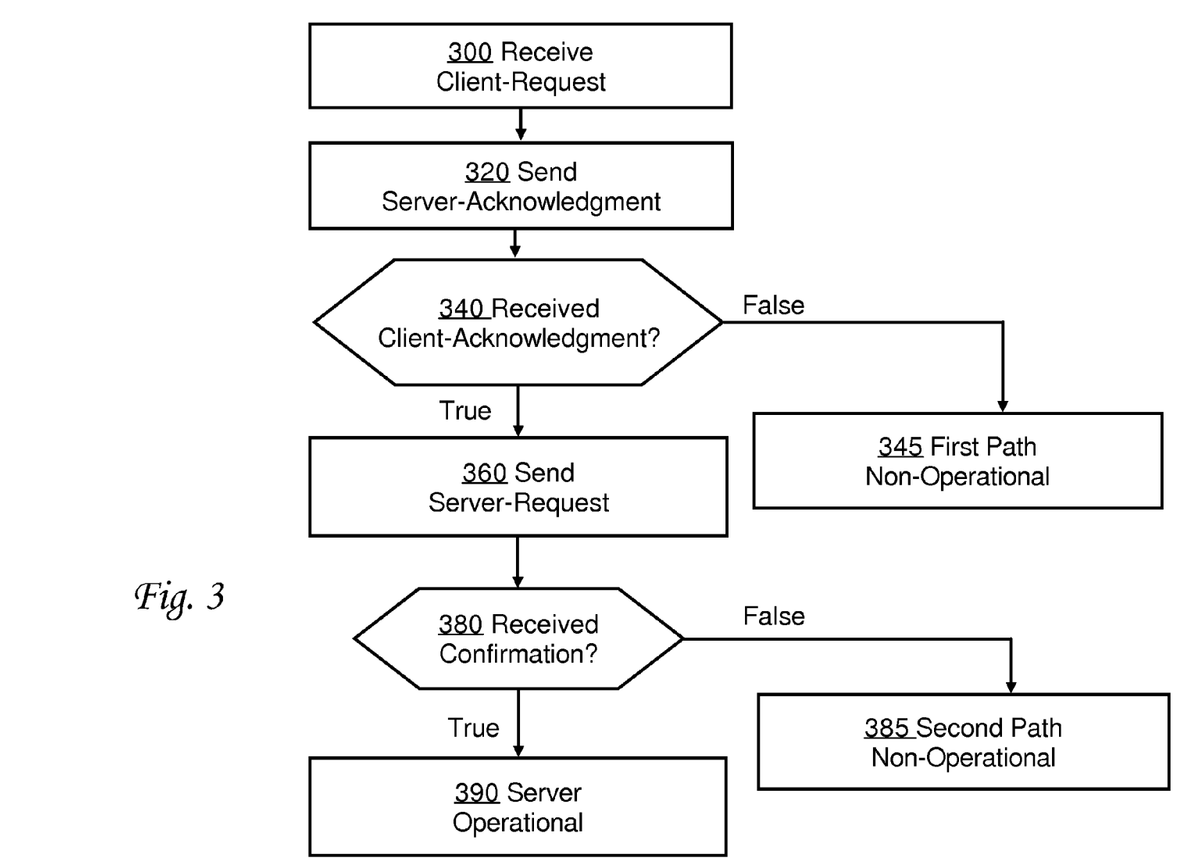
FIG. 3 illustrates an embodiment of testing connectivity between clients and servers.

FIG. 3 illustrates an embodiment of testing connectivity between clients and servers.

In step 300, a client request is received at a network protection device from a client. In an embodiment, the client request may be a request to establish a communications session between the client and a server. For example, the request may be a Transport Control Protocol (TCP) SYN segment to establish a TCP communications session, as described above.

In an embodiment, a client request is sent to initiate a TCP three-way handshake process, and the subsequent data packets are exchanged in compliance with the TCP three-way handshake process described above.

In an embodiment, a client request is received on an ingress port of the network protection device. The received client request is tagged by the network protection device, as described above.

In an embodiment, a client request is processed by a network protection device and transmitted from an ingress port of the network protection device to an egress port of the network protection device. As the client request is processed by the network protection device, actions performed with respect to the client request are recorded and correlated according to the tag associated with the client request. For example, the network protection device may perform an address translation for the client request, inspect the client request, or perform any other actions related to security policy and a firewall's functionalities.

Once the client request reaches an egress port of the network protection device, the client request may be dropped, and hence, further transmission of the client request toward a server may be terminated.

In step 320, a network protection device determines whether a server would have acknowledged a receipt of the client request, and if so, the network protection device generates and transmits a "spoofed" server acknowledgment to the client. For example, the network protection device may generate a TCP SYN-ACK segment as if such a packet was created by the server.

In an embodiment, a TCP SYN-ACK segment is tagged and injected onto an ingress port of the network protection device (which is closest to the server) and transmitted to an egress port of the network protection device to be sent to the client.

As the server acknowledgment is processed by the network protection device, the actions performed with respect to the server acknowledgment are recorded and correlated according to the tag associated with the server acknowledgment. For example, the network protection device may perform an address translation for the server acknowledgment, inspect the server acknowledgment, or perform any other actions related to security policy and a firewall's functionalities.

Once the server acknowledgment reaches an egress port of the network protection device, the server acknowledgment is transmitted to the client.

In step 340, a network protection device checks whether a client acknowledgment was received from the client in response to sending the server acknowledgment to the client. In an embodiment, the network protection device expects to receive a client acknowledgment in compliance with a TCP three-way handshake process.

If the expected client acknowledgment is received from the client, then the network protection device concludes that connectivity with the client is operational and that a "first leg" of the "end-to-end" path between the client and the server is functional. Subsequently, the network protection device performs the step 360.

However, if the expected client acknowledgment is not received within for example a predetermined time interval, then in step 345, the network protection device determines that one or more of the connections (a first path) between the client and the network protection device and/or the device executing the client application are nonoperational.

Various reasons for the connection or the device being non-operational have been described above. Various ways of communicating the problems with the connections and/or devices have also been described above.

Upon concluding that connectivity between the network protection device and a client is operational, in step 360, a network protection device generates a "spoofed" a server request to a server.

In an embodiment, a spoofed server request is a request to establish a communications session between the client and a server on behalf of a client. For example, the request may be a TCP SYN request to establish a TCP communications session described above.

In an embodiment, a server request is a spoofed request as if a client attempted to initiate a TCP three-way handshake process itself. The server request is injected into the ingress port of the network protection device, closest to the client.

In an embodiment, a server request is processed by a network protection device and transmitted from an ingress port of the network protection device to an egress port of the network protection device (second leg). As the server request is processed by the network protection device, the actions performed with respect to the server request are recorded and correlated according to the tag associated with the server request. For example, the network protection device may perform an address translation for the server request, inspect the server request, or perform any other actions related to security policy and a firewall's functionalities.

Once a server request reaches an egress port of the network protection device, the network protection device transmits the server request to a server.

In step 380, a network protection device checks whether a confirmation was received from a server in response to sending a server request to the server. In an embodiment, the network protection device expects to receive the confirmation as an acknowledgment SYN-ACK in compliance with a TCP three-way handshake process.

If the expected SYN-ACK segment is received from a server, then a network protection device proceeds to step 390, in which the network protection device concludes that connectivity with the server may be operational and that part of the "third leg" of the "end-to-end" path between the server and network protection device may be functional.

However, if the expected SYN-ACK segment is not received within a predetermined time interval, then in step 385, the network protection device determines that the connection (the third leg) between the network protection device and the server is non-operational.

Various reasons for the connection or the device being non-operational have been described above. Various ways of communicating the problems with the connections and/or devices have also been described above.

In an embodiment, combining the tests described above into a holistic solution provides a tool for efficient troubleshooting of an end-to-end path between clients and servers. The solution allows identifying the connectivity issue regardless of whether the source of the issue originates in a network security device known for performing complex processing of the transient packets or originates in links or devices communicating with the network security device. System administrators may utilize the solution to pin point connectivity problems in the networks even if the networks comprise complex and sophisticated network devices such as firewalls or gateways.

8.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
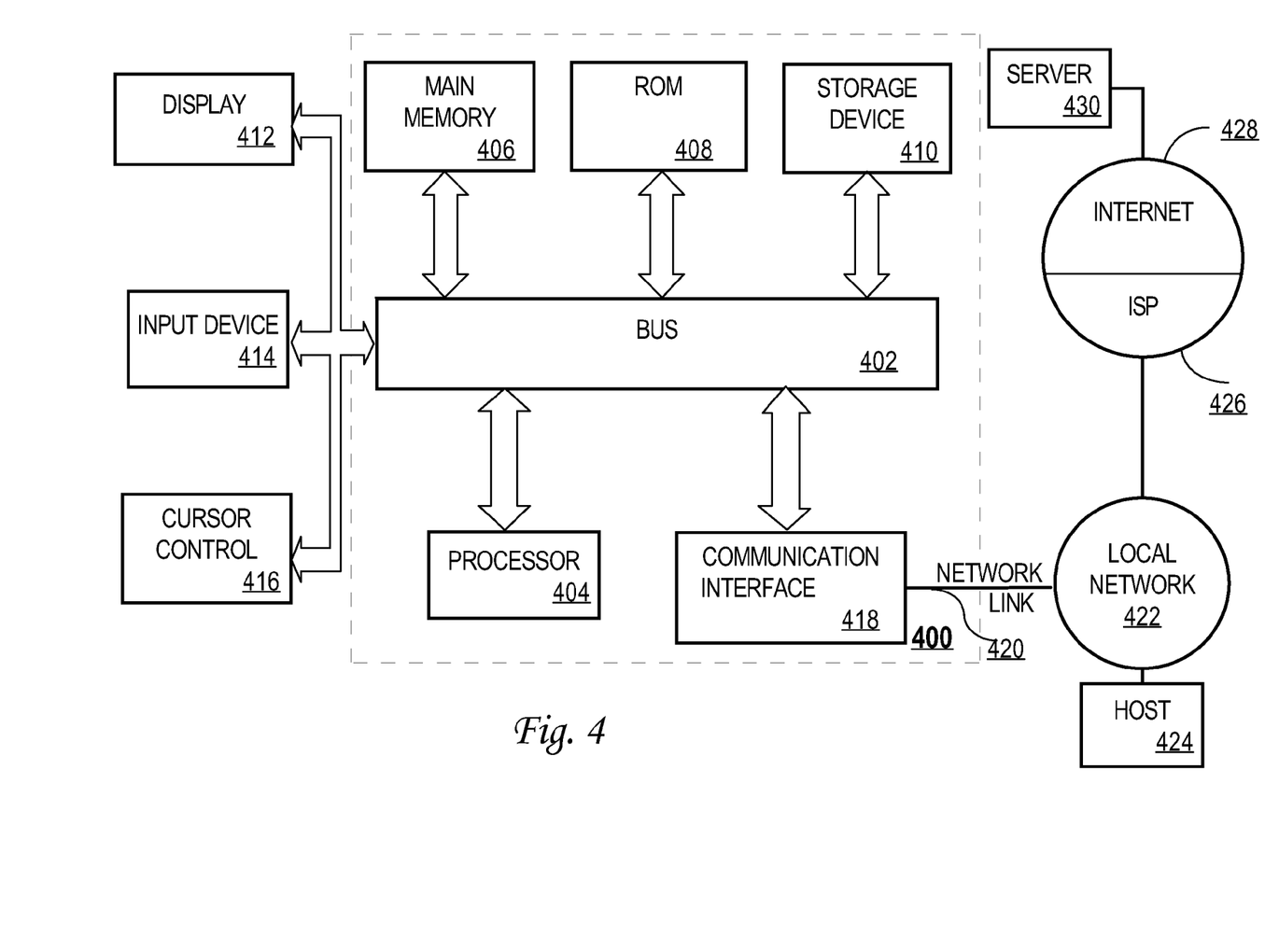
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
using a network protection device, in response to receiving from a client computer a client request to connect to a server:
processing the client request in the network protection device including applying one or more translations and one or more security checks,
using the network protection device, only when processing of the client request to connect to the server results in validating the client request:
generating, prior to communicating with the server, a server acknowledgment to the client computer as if the server acknowledged receiving the client request from the client computer,
processing the server acknowledgement in the network protection device including applying one or more translations and one or more security checks, and, using the network protection device, sending the server acknowledgment from the network protection device to the client computer,
in response to receiving, at the network protection device, a client acknowledgment from the client computer of receiving the server acknowledgment, only when processing of the client acknowledgement results in validating the client acknowledgement, determining that a first path between the client computer and the network protection device is operational;
after receiving the client acknowledgment from the client computer at the network protection device, generating, using the network protection device, a server request to the server; processing the server request in the network protection device including applying one or more translations and one or more security checks; and, in response to receiving a confirmation from the server that the server received the server request, determining that a second path between the network protection device and the server is operational.

2. The method of claim 1, further comprising:
in response to determining that the client request is not received within a first time period, determining that the network protection device or the first path to the network protection device is malfunctioning;
in response to determining that the client acknowledgment is not received within a second time period, determining that the first path is malfunctioning;
in response to determining that the confirmation from the server is not received within a third time period, determining that the server or the second path is malfunctioning.

3. The method of claim 1,
wherein the network protection device is any of the following: a firewall, an intrusion prevention device, a router and a switch;
wherein the first path either directly connects the client computer with the network protection device or connects the client computer with the network protection device via one or more intermediate devices;
wherein the second path either directly connects the network protection device with the server or connects the network protection device with the server via one or more intermediate devices.

4. The method of claim 1, wherein the client request is a Transmission Control Protocol (TCP) synchronization (SYN) packet, the server acknowledgment is a spoofed TCP synchronization-acknowledgment (SYN-ACK) packet, the client acknowledgment is a TCP acknowledgment (ACK) packet, the server request is a spoofed TCP SYN segment, and the confirmation is a TCP SYN-ACK segment.

5. The method of claim 1, wherein the network protection device is a security device configured to process a Network Address Translation (NAT)/Port Address Translation (PAT) request.

6. The method of claim 1, further comprising:
tagging the client request with a tag specific for the client request, correlating the client request with the server acknowledgment, and correlating the client acknowledgment with the client request and the server acknowledgement.

7. The method of claim 1, further comprising:
tagging the server request with the client request using the tag specific for the client request, correlating the server request with the client request, and correlating the confirmation with the server request and the client request.

8. A network routing apparatus, comprising:
one or more processors;
a transport control logic configured to perform:
using a network protection device, in response to receiving from a client computer a client request to connect to a server:
  processing the client request in a network protection device including applying one or more translations and one or more security checks,
  using the network protection device, only when processing of the client request to connect to the server results in validating the client request:
    generating, prior to communicating with the server, a server acknowledgment to the client computer as if the server acknowledged receiving the client request from the client computer,
    processing the server acknowledgement in the network protection device including applying one or more translations and one or more security checks and sending the server acknowledgment to the client computer,
    in response to receiving, at the network protection device, a client acknowledgment from the client computer of receiving the server acknowledgment, only when processing of the client acknowledgment results in validating the client acknowledgment, determining that a first path between the client computer and the network protection device is operational;
    after receiving the client acknowledgement from the client computer at the network protection device, generating, using the network protection device, a server request to the server; processing the server request in the network protection device including applying one or more translations and one or more security checks; and, in response to receiving a confirmation from the server that the server received the server request, determining that a second path between the network protection device and the server is operational.

9. The apparatus of claim 8, wherein the transport control logic is further configured to perform:
in response to determining that the client request is not received within a first time period, determining that the network protection device or the first path to the network protection device is malfunctioning;
in response to determining that the client acknowledgment is not received within a second time period, determining that the first path is malfunctioning;
in response to determining that the confirmation from the server is not received within a third time period, determining that the server or the second path is malfunctioning.

10. The apparatus of claim 8,
wherein the network protection device is any of the following: a firewall, an intrusion prevention device, a router and a switch;
wherein the first path either directly connects the client computer with the network protection device or connects the client computer with the network protection device via one or more intermediate devices;
wherein the second path either directly connects the network protection device with the server or connects the network protection device with the server via one or more intermediate devices.

11. The apparatus of claim 8, wherein the client request is a Transmission Control Protocol (TCP) synchronization (SYN) packet, the server acknowledgment is a spoofed TCP synchronization-acknowledgment (SYN-ACK) packet, the client acknowledgment is a TCP acknowledgment (ACK) packet, the server request is a spoofed TCP SYN segment, and the confirmation is a TCP SYN-ACK segment.

12. The apparatus of claim 8, wherein the network protection device is a security device configured to process a Network Address Translation (NAT)/Port Address Translation (PAT) request.

13. The apparatus of claim 8, wherein the transport control logic is further configured to perform:
tagging the client request with a tag specific for the client request, correlating the client request with the server acknowledgment, and correlating the client acknowledgment with the client request and the server acknowledgement.

14. The apparatus of claim 13, wherein the transport control logic is further configured to perform:
tagging the server request with the client request using the tag specific for the client request, correlating the server request with the client request, and correlating the confirmation with the server request and the client request.

15. A non-transitory computer-readable storage medium storing one or more sequences of instructions which, when executed by one or more processors, cause the processors to perform:
using a network protection device, in response to receiving from a client computer a client request to connect to a server:
  processing the client request in the network protection device including applying one or more translations and one or more security checks,
  using the network protection device, only when processing of the client request to connect to the server results in validating the client request:
    generating, prior to communicating with the server, a server acknowledgment to the client computer as if the server acknowledged receiving the client request from the client computer,
    processing the server acknowledgement in the network protection device including applying one or more translations and one or more security checks and, using the network protection device, sending the server acknowledgment to the client computer,
    in response to receiving, at the network protection device, a client acknowledgment from the client computer of receiving the server acknowledgment, only when rocessin of the client acknowledgment results in validatin the client acknowledgment, determining that a first path between the client computer and the network protection device is operational;
    after receiving the client acknowledgment from the client computer at the network protection device, generating, using the network protection device, a server request to the server; processing the server request in the network protection device including applying one or more translations and one or more security checks; and, in response to receiving a confirmation from the server that the server received the server request, determining that a second path between the network protection device and the server is operational.

16. The non-transitory computer-readable storage medium of claim 15, further storing instructions which, when executed, cause the processors to perform:
   in response to determining that the client request is not received within a first time period, determining that the network protection device or the first path to the network protection device is malfunctioning;
   in response to determining that the client acknowledgment is not received within a second time period, determining that the first path is malfunctioning;
   in response to determining that the confirmation from the server is not received within a third time period, determining that the server or the second path is malfunctioning.

17. The non-transitory computer-readable storage medium of claim 15,
   wherein the network protection device is any of the following: a firewall, an intrusion prevention device, a router and a switch;
   wherein the first path either directly connects the client computer with the network protection device or connects the client computer with the network protection device via one or more intermediate devices;
   wherein the second path either directly connects the network protection device with the server or connects the network protection device with the server via one or more intermediate devices.

18. The non-transitory computer-readable storage medium of claim 15, wherein the client request is a Transmission Control Protocol (TCP) synchronization (SYN) packet, the server acknowledgment is a spoofed TCP synchronization-acknowledgment (SYN-ACK) packet, the client acknowledgment is a TCP acknowledgment (ACK) packet, the server request is a spoofed TCP SYN segment, and the confirmation is a TCP SYN-ACK segment.

19. The non-transitory computer-readable storage medium of claim 15, wherein the network protection device is configured to process a Network Address Translation (NAT)/Port Address Translation (PAT) request.

20. The non-transitory computer-readable storage medium of claim 15, wherein the non-transitory computer-readable storage medium further comprises instructions which, when executed, cause performing:
   tagging the client request with a tag specific for the client request, correlating the client request with the server acknowledgment, and correlating the client acknowledgment with the client request and the server acknowledgement;
   tagging the server request with the client request using the tag specific for the client request, correlating the server request with the client request, and correlating the confirmation with the server request and the client request.

* * * * *